(12) United States Patent
Lee

(10) Patent No.: US 8,289,655 B2
(45) Date of Patent: Oct. 16, 2012

(54) HARD DISK DRIVE HAVING AN ACTUATOR WHOSE LENGTH IS LESS THAN THE DISTANCE BETWEEN ITS AXIS OF ROTATION AND THE AXIS OF ROTATION OF A DISK OF THE DRIVE

(75) Inventor: Chul-woo Lee, Seoul (KR)

(73) Assignee: Seagate Technology International, Grand Cayman (KY)

( * ) Notice: Subject to any disclaimer, the term of this patent is extended or adjusted under 35 U.S.C. 154(b) by 233 days.

(21) Appl. No.: 12/685,692

(22) Filed: Jan. 12, 2010

(65) Prior Publication Data
US 2010/0246068 A1    Sep. 30, 2010

(30) Foreign Application Priority Data

Mar. 30, 2009   (KR) .................. 10-2009-0026954

(51) Int. Cl.
    *G11B 5/55*    (2006.01)
(52) U.S. Cl. .................. 360/264.1; 360/265.9
(58) Field of Classification Search ............... 360/265.9, 360/266, 266.1, 264.1, 264.3
    See application file for complete search history.

(56) References Cited

U.S. PATENT DOCUMENTS

| | | | | |
|---|---|---|---|---|
| 4,714,972 A | * | 12/1987 | Biermeier et al. | 360/97.03 |
| 4,819,100 A | * | 4/1989 | Asano | 360/97.16 |
| 4,945,427 A | * | 7/1990 | Cunningham | 360/75 |
| 5,566,375 A | * | 10/1996 | Isomura | 360/256.2 |
| 5,724,212 A | * | 3/1998 | Mallary et al. | 360/264.1 |
| 5,870,253 A | * | 2/1999 | Ogawa et al. | 360/245.9 |
| 6,738,229 B2 | * | 5/2004 | Williams | 360/266.1 |
| 7,072,147 B2 | * | 7/2006 | Limmer et al. | 360/264.1 |
| 7,193,807 B1 | * | 3/2007 | Liikanen et al. | 360/76 |
| 7,855,857 B2 | * | 12/2010 | Hayakawa et al. | 360/266 |
| 8,009,388 B2 | * | 8/2011 | Oh et al. | 360/234.7 |
| 2002/0101687 A1 | * | 8/2002 | Belser | 360/264.3 |
| 2004/0233573 A1 | * | 11/2004 | Kuwajima et al. | 360/97.01 |
| 2004/0257710 A1 | * | 12/2004 | Limmer et al. | 360/264.3 |
| 2005/0264917 A1 | * | 12/2005 | Yano et al. | 360/75 |
| 2007/0247745 A1 | * | 10/2007 | Teguri | 360/122 |
| 2010/0259850 A1 | * | 10/2010 | Miyake et al. | 360/234.7 |

FOREIGN PATENT DOCUMENTS

| | | |
|---|---|---|
| KR | 09-073739 | 3/1997 |
| KR | 100223630 B1 | 7/1999 |
| KR | 2005-063576 | 3/2005 |

* cited by examiner

*Primary Examiner* — Brian Miller
(74) *Attorney, Agent, or Firm* — Volentine & Whitt, PLLC

(57) ABSTRACT

In a hard disk drive (HDD), a ratio of the distance R between the axis of rotation of an actuator and a magnetic head to the distance $R_0$ between the axis of rotation of the actuator and the center of a disk is in the range of 0.9 to 0.96. Thus, the deviation of the skew angles for the tracks from 0 degrees is minimized and yet a swing arm of the actuator can be relatively short. Accordingly, not only is the recording density maximized, but the HDD can be small and light as well.

3 Claims, 5 Drawing Sheets

HARD DISK DRIVE HAVING AN ACTUATOR WHOSE LENGTH IS LESS THAN THE DISTANCE BETWEEN ITS AXIS OF ROTATION AND THE AXIS OF ROTATION OF A DISK OF THE DRIVE

CROSS-REFERENCE TO RELATED APPLICATIONS

This application claims the benefit of Korean Patent Application No. 10-2009-0026954, filed on Mar. 30, 2009, in the Korean Intellectual Property Office.

BACKGROUND

The present inventive concept relates to a hard disk drive (HDD). More particularly, the inventive concept relates to the actuator of a HDD which carries a magnetic head for reading/writing information from/onto a disk.

Referring to FIG. 1 a conventional HDD includes a disk 10 having a plurality of tracks containing information, a magnetic head 20 for reading and recording information from and onto the tracks of the disk 10, and an actuator for moving the magnetic head 20 over the disk 10. The actuator includes a swing arm 31 that is rotatable about an axis 35, and a voice coil motor 32 that rotates (drives) the swing arm 31. The magnetic head 20 is supported by an end of the swing arm 31.

Thus, during a read/write operation of the HDD, the voice coil motor 32 rotates the swing arm 31 in a first direction about axis 35 to position the magnetic head 20 over a selected track(s) of the disk 10 where the magnetic head reads/records information from/onto the disk 10 while the disk 10 is rotated. A suspension 33 at the end of the swing arm 31 elastically supports the magnetic head 20 so that the magnetic head 20 floats above the disk 10 during the read/write operation. In a stop mode, the voice coil motor 32 rotates the swing arm 31 in a second direction about axis 35, i.e., a direction that is opposite to the first direction, to move the magnetic head 20 off of the disk 10. At this time, an end tab 34 of the swing arm 31 is moved along and comes to rest on a ramp on 40 to "park" the magnetic head 20. A latch 50 locks the swing arm 31 while the magnetic head 20 is parked.

The angle at which the magnetic head 20 is oriented relative to a track of the disk 10 during a read/write operation in which the head 20 is positioned over the track is referred to as a skew angle. As described above, the swing arm 31 of the actuator is supported so as to rotate about a fixed axis 35. Accordingly, the skew angles between the magnetic head 20 and the tracks of the disk 10 vary. The greater the skew angle, the lower the recording density can be for a particular track wherein the recording density is the amount of information that can be stored per unit area on the disk.

In this respect, as illustrated in FIG. 2A, when the skew angle between a track 11 of a disk and the magnetic head 20 is 0 degrees, the track width may be optimally minimal and so the recording density for the track 11 may be maximal. However, the skew angle cannot be 0 degrees for all of the tracks because the disk 10 is fixed in place about an axis of rotation and the magnetic head 10 is rotated about an axis 35 that is spaced therefrom. FIG. 2B illustrates an example of a track 11 for which the skew angle is about 15 degrees. In this case, the width W of the track needs to be greater than that for cases, such as that illustrated in FIG. 2A, in which the skew angle is smaller to prevent interference between adjacent tracks 11. Thus, the recording density of the track 11 shown in FIG. 2B is less than that of the track 11 shown in FIG. 2A.

Taking the above into consideration, it is advantageous to minimize the amounts that the skew angles deviate from 0 degrees across the disk 10, i.e. for each of the tracks of the disk 10. To this end, lengthening the swing arm 31 has been considered. However, lengthening the swing arm 31 requires that the size of the HDD also be increased. Such a solution unavails itself to meet the current demand for smaller and lighter HDDs. Also, it is difficult to manufacture a practical and reliable HDD having a relatively long swing arm 31. In particular, technical problems arise with respect to the reading/writing of information when the swing arm 31 is relatively long such that the read/writing of information is not carried out in a limited space.

SUMMARY

According to an aspect of the inventive concept, there is provided a hard disk drive (HDD) which includes a disk having a plurality of concentric tracks along which information can be/is stored, a magnetic head for reading and/or recording information from and/or on a recording region of the disk containing the tracks, and an actuator supporting the magnetic head and rotatable about an axis for moving the magnetic head across the recording region to position the magnetic head over selected ones of the tracks, and whose ratio $R/R_0$ is in the range of 0.9 to 0.96 wherein R is the distance between the axis of rotation of the actuator and the magnetic head and $R_0$ is the distance between axis of rotation of the actuator and the center of the disk.

BRIEF DESCRIPTION OF THE DRAWINGS

Embodiments of the inventive concept will be described in more detail hereinafter with reference the accompanying drawings in which.

DETAILED DESCRIPTION OF THE PREFERRED EMBODIMENTS

Hereinafter, embodiments of the inventive concept will be described in detail with reference to FIGS. 3-5.

Figure 1:
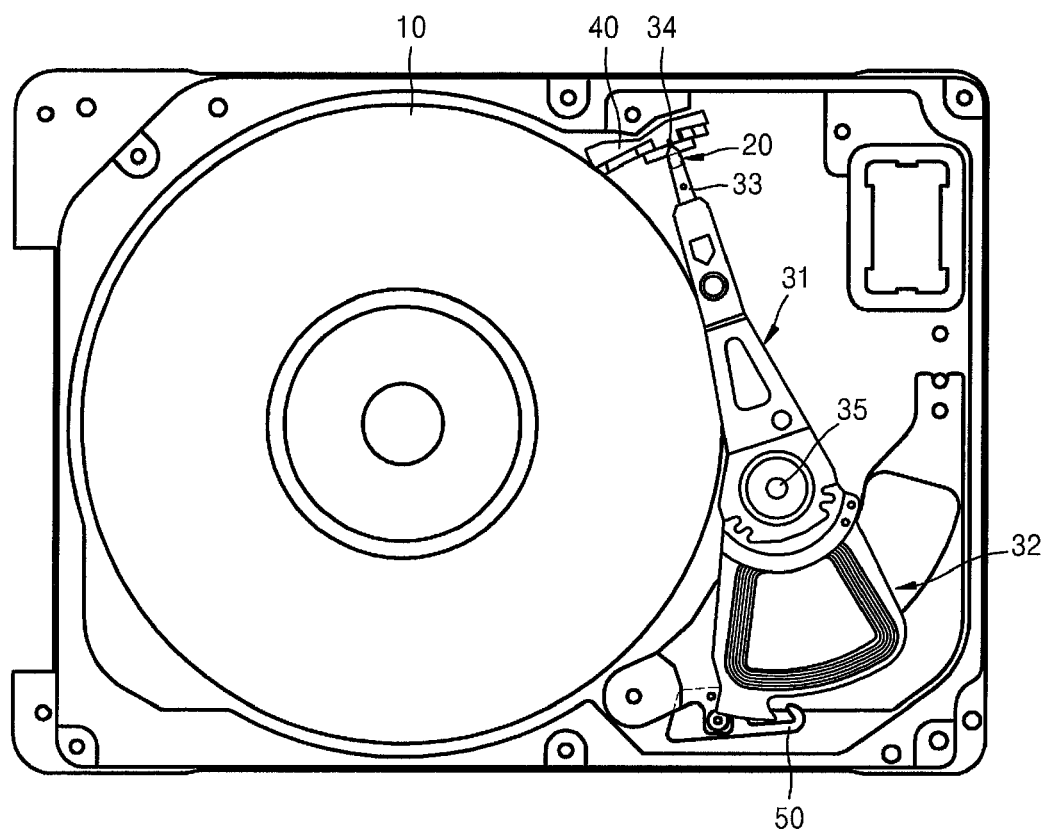
FIG. 1 is a plan view of conventional hard disk drive (HDD)
Figure 2A:
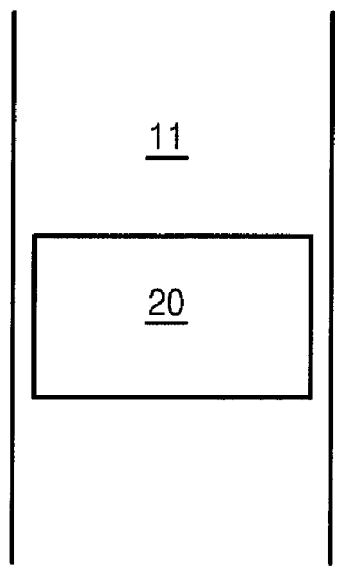
FIGS. 2A and 2B are conceptual diagrams and each illustrate a skew angle in the HDD of FIG. 1.
Figure 2B:
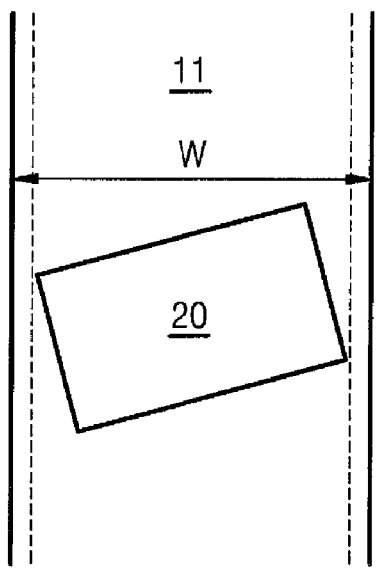
Figure 3:
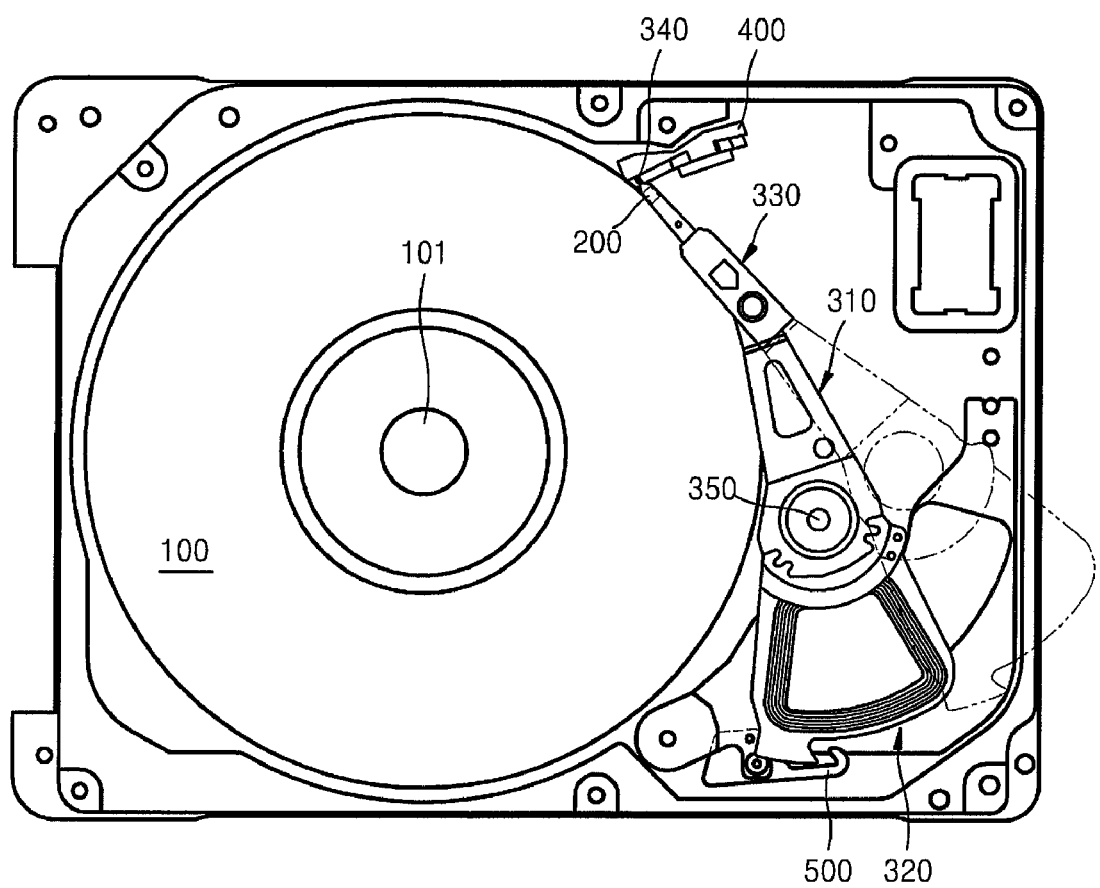
FIG. 3 is a plan view of an HDD embodied according to the inventive concept.

Referring first to FIG. 3, an embodiment of an HDD according to the inventive concept includes a disk 100 having a plurality of tracks, a magnetic head 200 for reading/recording information from/onto the disk 100, an actuator for positioning the magnetic head 200 over the disk 100, and a voice coil motor 320. The actuator includes a swing arm 310 rotated by the voice coil motor 320 about an axis 350, and a suspension 330 disposed at an end of the swing arm 310 and elastically supporting the magnetic head 200 so that the magnetic head 200 floats above the disk 100 during a read/write operation. Reference number 400 designates a ramp on which an end tab 340 of the end of the swing arm 310 rests when the magnetic head 200 is parked while the HDD is in a stop mode. Reference number 500 designates a latch for locking the swing arm 310 in place while the magnetic head 200 is parked.

The swing arm 310 and the suspension 330 are coupled at a predetermined angle rather than being coupled in a straight line. In other words, the longitudinal axes of the swing arm 310 and the suspension 330 subtend an angle less than 180 degrees. In particular, the suspension 330 is inclined relative to the swing arm 310 towards the axis of rotation 101 of the disk 100. Thus, the actuator is accommodated within a relatively narrow space. Specifically, the dashed lines in FIG. 3 show the area that the actuator would have to occupy in the case in which the swing arm 310 and the suspension 330 were coupled in a straight line and provided a skew angle of 0 degrees between the magnetic head and the outermost track of the disk 100. On the other hand, as is also shown in FIG. 3 in solid lines, the space that has to be provided by the HDD to accommodate the actuator is much less in the present embodiment in which the suspension 330 is inclined relative to the swing arm 310 towards the axis of rotation 101 of the disk 100.

Also, according to the inventive concept, deviations of the skew angle from 0 degrees are minimized by an appropriate sizing of the actuator. In this respect, and referring to FIG. 4, the skew angle θ for any track in an embodiment of an HDD whose actuator has the basic structure shown in the figure can be determined from the following Equation 1:

$$\theta = (\pi/2) - \cos^{-1}\{-(R_0^2 - R^2 - r^2)/(2Rr)\} \quad (1)$$

wherein r is the distance between the axis of rotation (hereinafter "center") 101 of the disk 100 and the magnetic head 200, $R_0$ is the distance between the center 101 of the disk 100 and the axis of rotation 350 of the swing arm 310, and R is the distance between the axis of rotation 350 of the swing arm 310 and the magnetic head 200.

Figure 4:
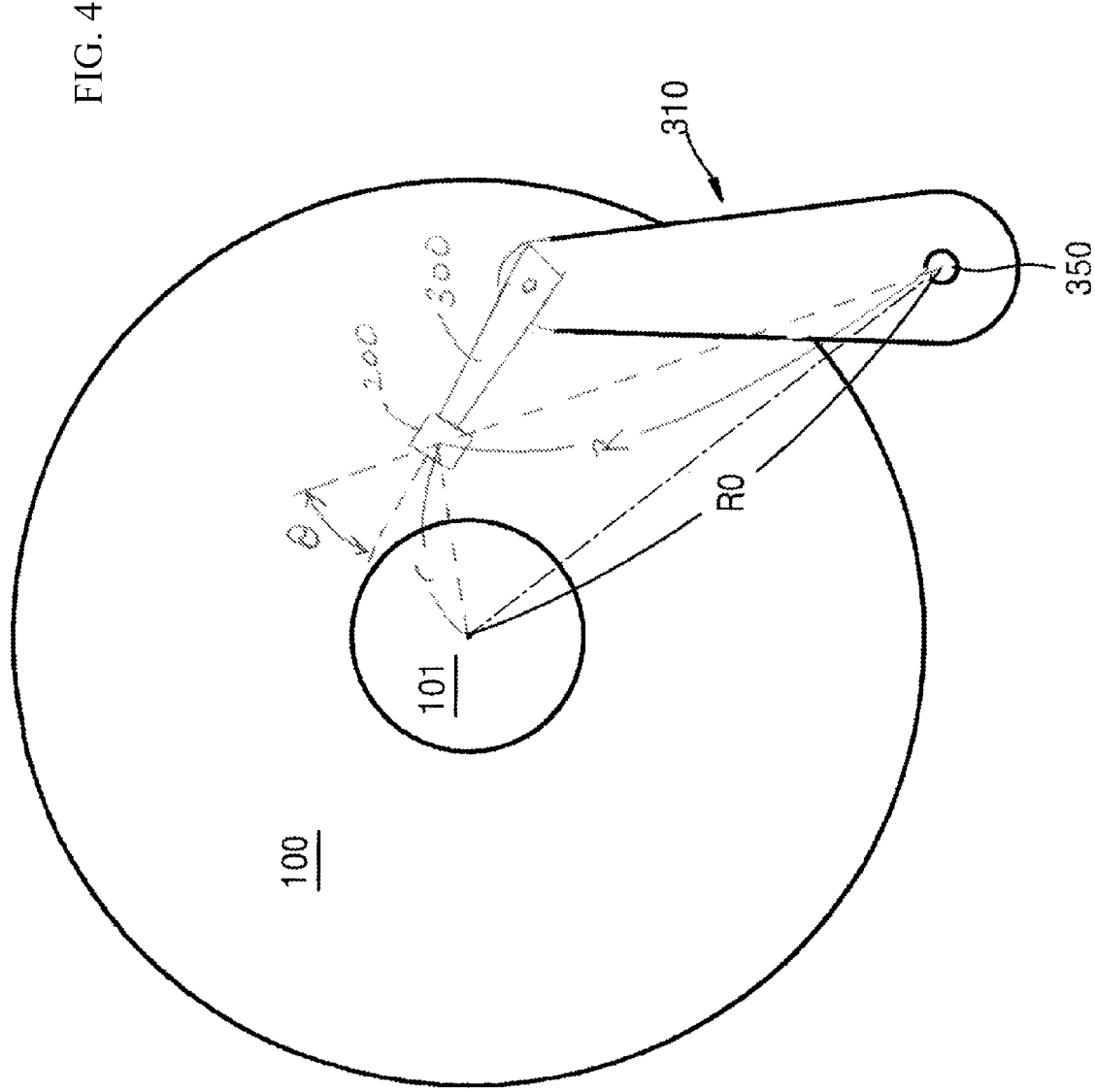
FIG. 4 is a conceptual diagram of essential parts of the HDD of FIG. 3.
Figure 5:
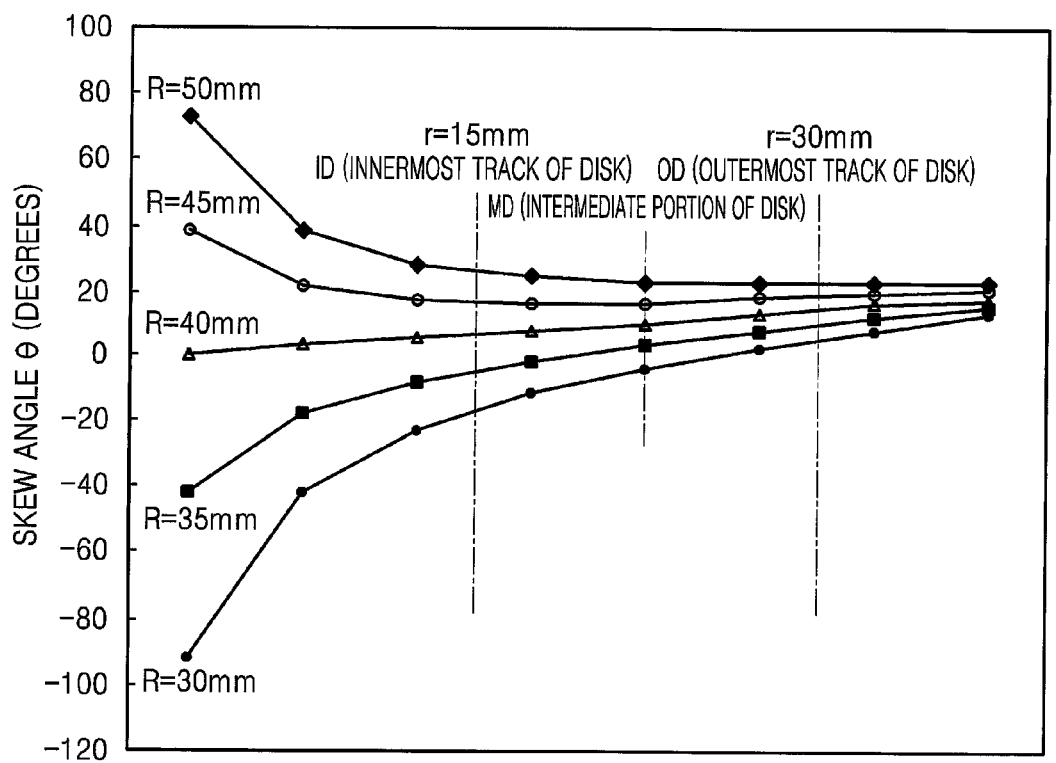
FIG. 5 is a graph showing changes in the skew angle across a disk for various HDDs each having the basic structure shown in FIG. 4 but whose dimensions R differ from one another, wherein R is the distance between the axis of rotation of the swing arm of the HDD and the magnetic head of the HDD.

Skew angles for examples of an HDD having the basic structure illustrated in FIG. 4 are shown in the graph of FIG. 5. In each example of an HDD, the diameter of the disk 100 is 2.5 inches, and the distance $R_0$ is 40 mm. On the other hand, the distances R of the HDDs varied from one another within a range of 30 to 50 mm, and the distance r ranged between 15 mm (at the innermost track of the disk 100) to 30 mm (at the outermost track of the disk 100) for each HDD.

As can be discerned from FIG. 5, as the swing arm 310 becomes shorter, i.e., as R becomes smaller, the skew angles become smaller across the entire the disk 100 disk, including in the recording region between the innermost track (r=15 mm) to the outermost track (r=30 mm), because the skew angles are proportional to R. Likewise, as the swing arm 310 becomes longer, i.e., as the distance R becomes greater, the skew angles become larger. Furthermore, the deviation of the skew angles from 0 degrees is remarkably small for the HDD in which the distance R is 40 mm, especially in the recording region of the disk 100. However, in that HDD the swing arm 310 is excessively long. Accordingly, an HDD according to the inventive concept has a ratio $R/R_0$ such that both the size and the deviations of the skew angles from 0 degrees are minimized.

In consideration of the above, bit error rate (BER) gains for the HDDs were considered. The BER gains according to the ratios $R/R_0$ are shown in Table 1. The BER gains shown in Table 1 are values relative to the HDD identified as case 0 in the table. The HDD represented by case 0 is a typical HDD having a 2.5 inch diameter disk.

TABLE 1

| HDD | R (mm) | $R/R_0$ | BER gain |
|---|---|---|---|
| case 0 | 34.49 | 0.862 | 0 |
| case 1 | 37.78 | 0.945 | 0.54 |
| case 2 | 38.06 | 0.952 | 0.64 |
| case 3 | 38.54 | 0.964 | 0.60 |
| case 4 | 39.31 | 0.983 | 0.70 |
| case 5 | 41.03 | 1.030 | 0.96 |

The BER gain is a factor which is correlated to the recording area of a disk More specifically, the greater the BER gain, the smaller the BER is and thus, the greater is the area available for recording/storing information. As shown in Table 1, in terms of the BER gain, the case 5 in which R (~40 mm) is greater than $R_0$ is the best. However, the swing arm is excessively long in those cases of an HDD in which the distance R is equal to or greater than the distance R=38.54 (the HDD of case 3). Accordingly, in those cases of an HDD in which the distance R is equal to or greater than the distance R=38.54 (the HDD of case 3), the HDDs are too big and excessive shocks are produced during the rotation of the disk.

Accordingly, the ratio $R/R_0$ in an HDD according to the inventive concept is not higher than 0.96 and may be equal to or greater than 0.90. An HDD in which the ratio $R/R_0$ is in the range of 0.90 to 0.96 is advantageous in that the skew angles will deviate little from 0 degrees across the disk (especially across the recording area of the disk whereby the recording density of the disk is maximized, and yet the size (footprint) of the HDD can be kept to a minimum.

In addition, the recording density of the disk is maximized according to an aspect of the inventive concept due to the fact that a skew angle of 0 degrees may be provided at the outermost track rather than at an intermediate track (a track located between the innermost and outermost tracks). In this case, the skew angles are smaller for the tracks that run adjacent the outer periphery of the disk 100 than those that run radially inwardly thereof along inner portions of the disk 100. Of course, the outer periphery of the disk is longer than the inner circumferentially extending portions of the disk. Therefore, the recording density may be maximized by minimizing the width of a radially outer one of the tracks.

In particular, the radially outermost track of a typical disk of a hard drive includes a dead zone. That is, the dead zone or radially outermost portion of the disk is not within the recording area of the disk. Once the magnetic head reaches the dead zone from a position over one of the tracks, the swing arm is rotated so that the magnetic head is parked on the ramp. In an embodiment according to the inventive concept in which the radially outermost track of the disk 100 is a dead zone, the skew angle for the radially outermost track is minimal so that width of the dead zone may be minimal as well. Thus, this also helps to maximize the recording density.

Finally, embodiments of the inventive concept have been described herein in detail. The inventive concept may, however, be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiments described above but by the following claims.

What is claimed is:

1. A hard disk drive (HDD) comprising:
a disk having a recording region containing a plurality of tracks each extending in the circumferential direction of the disk, the tracks being concentric with respect to a center of the disk;
a magnetic head operative to read information from and/or record information on the recording region of the disk; and
an actuator supported so as to be rotatable about an axis, the magnetic head being supported by the actuator so as to rotate therewith about said axis,
the ratio $R/R_0$ of the HDD being in the range of 0.9 to 0.96 wherein R is the distance between the axis of rotation of the actuator and the magnetic head, and $R_0$ is the distance between the axis of rotation of the actuator and the center of the disk, and
wherein the absolute value of the angle at which the magnetic head is skewed relative to any of the tracks, in a plane parallel to the disk, when the magnetic head is positioned by the actuator over the track is smallest for the radially outermost one of the tracks in the recording region of the disk.

2. The HDD of claim 1, wherein an angle at which the magnetic head is skewed relative to one of the tracks, in a plane parallel to the disk, when the magnetic head is positioned by the actuator over said one of the tracks is 0 degrees,
the absolute value of the angle at which the magnetic head is skewed relative to another of the tracks, in a plane parallel to the disk, when the magnetic head is positioned by the actuator over said another of the tracks is greater than 0 degrees,
and said one of the tracks is closer to the outer periphery of the disk than said another of the tracks.

3. The HDD of claim 1, wherein the actuator comprises a swing arm, and a suspension disposed at an end of the swing arm, the magnetic head being carried by the suspension, the suspension being flexible so as to elastically support the magnetic head, and the suspension being inclined relative to the swing arm towards the center of the disk such that the suspension and the swing arm have longitudinal axes, respectively, that subtend an angle of less than 180 degrees.

* * * * *